United States Patent
Ikoma

(10) Patent No.: US 9,211,604 B2
(45) Date of Patent: Dec. 15, 2015

(54) RESISTANCE WELDING METHOD AND RESISTANCE WELDING JIG

(75) Inventor: Nobukazu Ikoma, Aichi (JP)

(73) Assignee: NGK INSULATORS, LTD., Nagoya (JP)

( * ) Notice: Subject to any disclaimer, the term of this patent is extended or adjusted under 35 U.S.C. 154(b) by 707 days.

(21) Appl. No.: 13/431,604

(22) Filed: Mar. 27, 2012

(65) Prior Publication Data

US 2012/0248071 A1   Oct. 4, 2012

(30) Foreign Application Priority Data

Mar. 30, 2011  (JP) .................. 2011-076381

(51) Int. Cl.
| | |
|---|---|
| B23K 11/02 | (2006.01) |
| B23K 11/00 | (2006.01) |
| B23K 11/093 | (2006.01) |
| B23K 11/30 | (2006.01) |
| B23K 11/36 | (2006.01) |

(52) U.S. Cl.
   CPC ........... B23K 11/002 (2013.01); B23K 11/0935 (2013.01); B23K 11/3081 (2013.01); B23K 11/36 (2013.01)

(58) Field of Classification Search
   CPC ............ B23K 11/002; B23K 11/0935; B23K 11/3081; B23K 11/36; B23K 11/093; B23K 37/0443; B23K 2201/04; B23K 2201/06; B23K 11/0033; B23K 11/004; B23K 11/0046; B23K 11/02; B23K 11/087
   USPC .......... 219/86.24, 91.2, 104, 101, 117.1, 158, 219/161
   See application file for complete search history.

(56) References Cited

U.S. PATENT DOCUMENTS

| | | | | |
|---|---|---|---|---|
| 2,731,535 | A | * | 1/1956 | Grey .............................. 219/119 |
| 4,609,805 | A | * | 9/1986 | Tobita et al. .................... 219/93 |
| 5,248,869 | A | | 9/1993 | DeBell et al. |
| 5,705,784 | A | * | 1/1998 | Aoyama et al. ............... 219/119 |
| 6,008,463 | A | * | 12/1999 | Aoyama et al. ............... 219/119 |
| 6,175,097 | B1 | * | 1/2001 | Raghavan et al. ............. 219/158 |
| 6,770,835 | B1 | * | 8/2004 | Hengel et al. .................. 219/93 |

(Continued)

FOREIGN PATENT DOCUMENTS

| | | |
|---|---|---|
| DE | 102 09 492 A1 | 10/2003 |
| DE | 10 2006 013342 B3 | 9/2007 |

(Continued)

OTHER PUBLICATIONS

European Search Report of the corresponding European Application No. 12161232.9, dated Jul. 23, 2012.

*Primary Examiner* — Dana Ross
*Assistant Examiner* — James Sims, III
(74) *Attorney, Agent, or Firm* — Global IP Counselors, LLP

(57) ABSTRACT

In resistance welding, an end portion and a flange portion are welded together at contact surfaces thereof by applying a voltage between a first electrode and a second electrode while an inner casing and a main metal piece are pressed in directions toward each other. When a shearing stress due to the pressure is applied to a ceramic guide pin, the guide pin is more resistant to wear compared to a phenolic resin guide pin. In addition, a clearance is between a large-diameter portion of the guide pin and an inner surface of a guide-pin insertion hole. Accordingly, the guide pin is capable of tilting in the radial direction, so that the guide pin can tilt so as to partially absorb the shearing stress. Therefore, the guide pin is more resistant to breakage compared to a guide pin made of ceramic that is not capable of tilting.

6 Claims, 11 Drawing Sheets

(56) References Cited

U.S. PATENT DOCUMENTS 6,825,436 B1 * 11/2004 Aoyama et al. ............ 219/117.1
8,294,064 B1 * 10/2012 Raiche et al. ................ 219/136

FOREIGN PATENT DOCUMENTS

| JP | 10-318980 A | 12/1998 |
| JP | 2000-337259 A | 12/2000 |

* cited by examiner

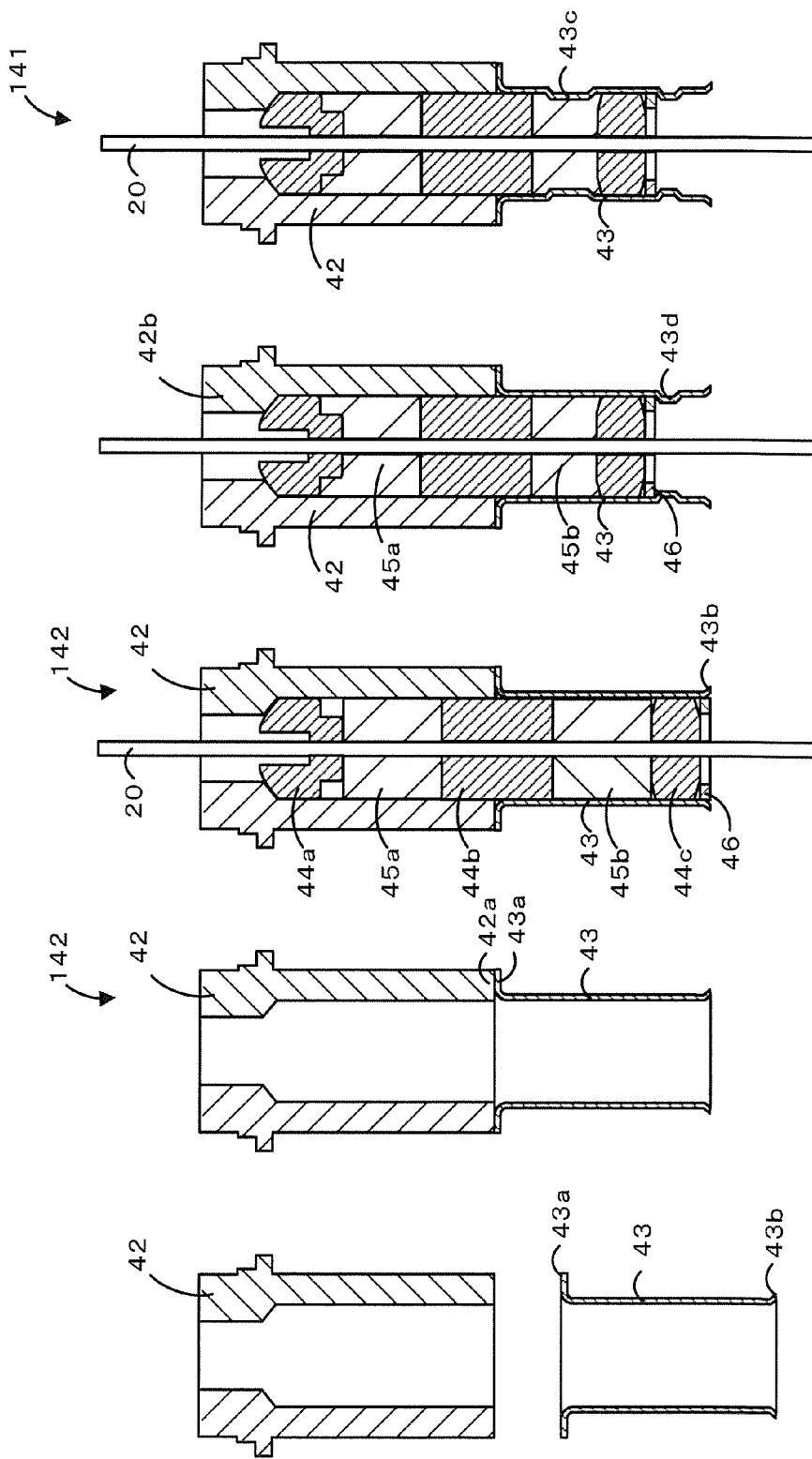

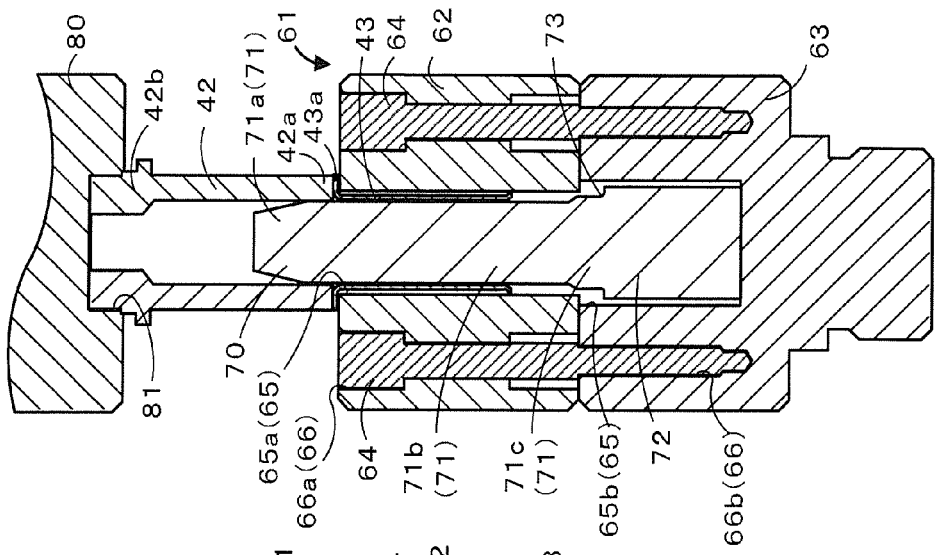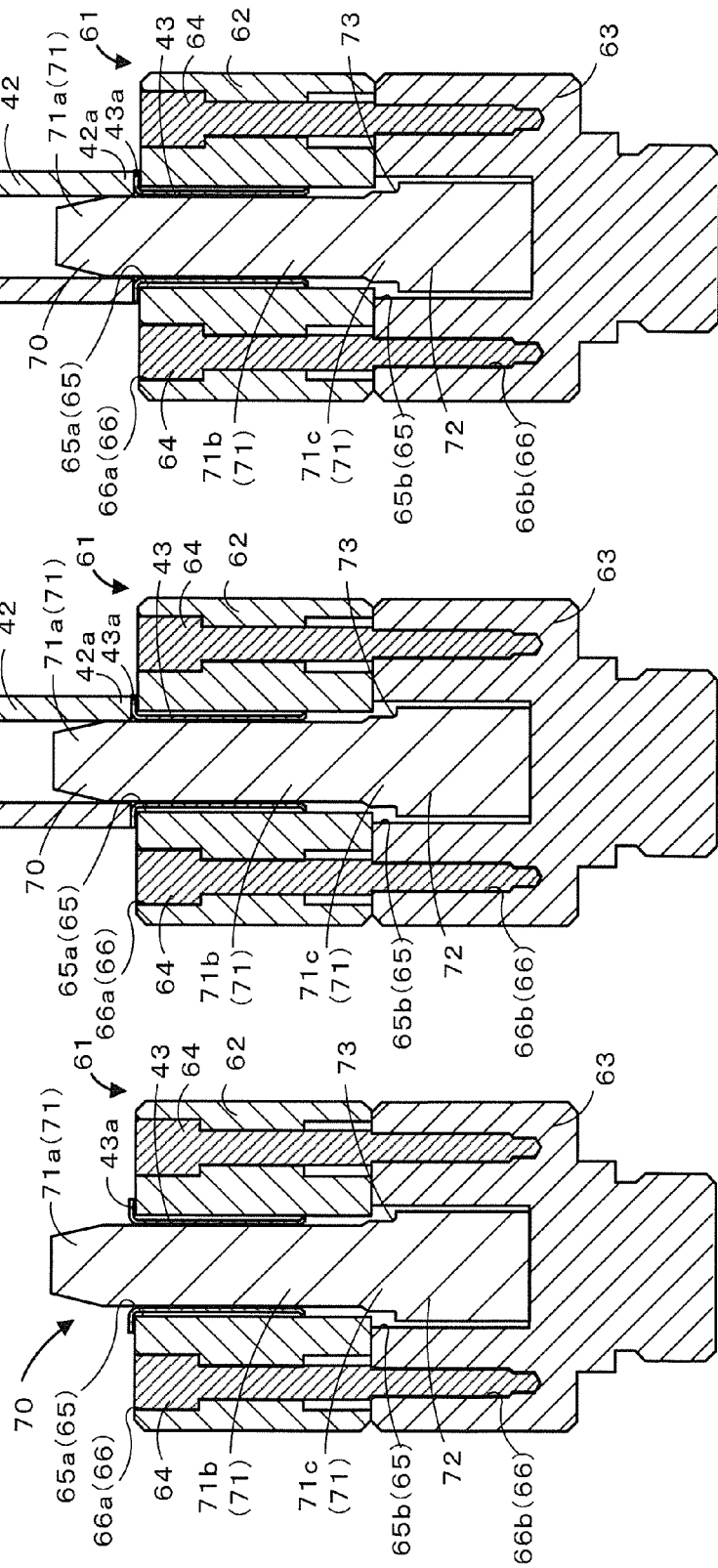

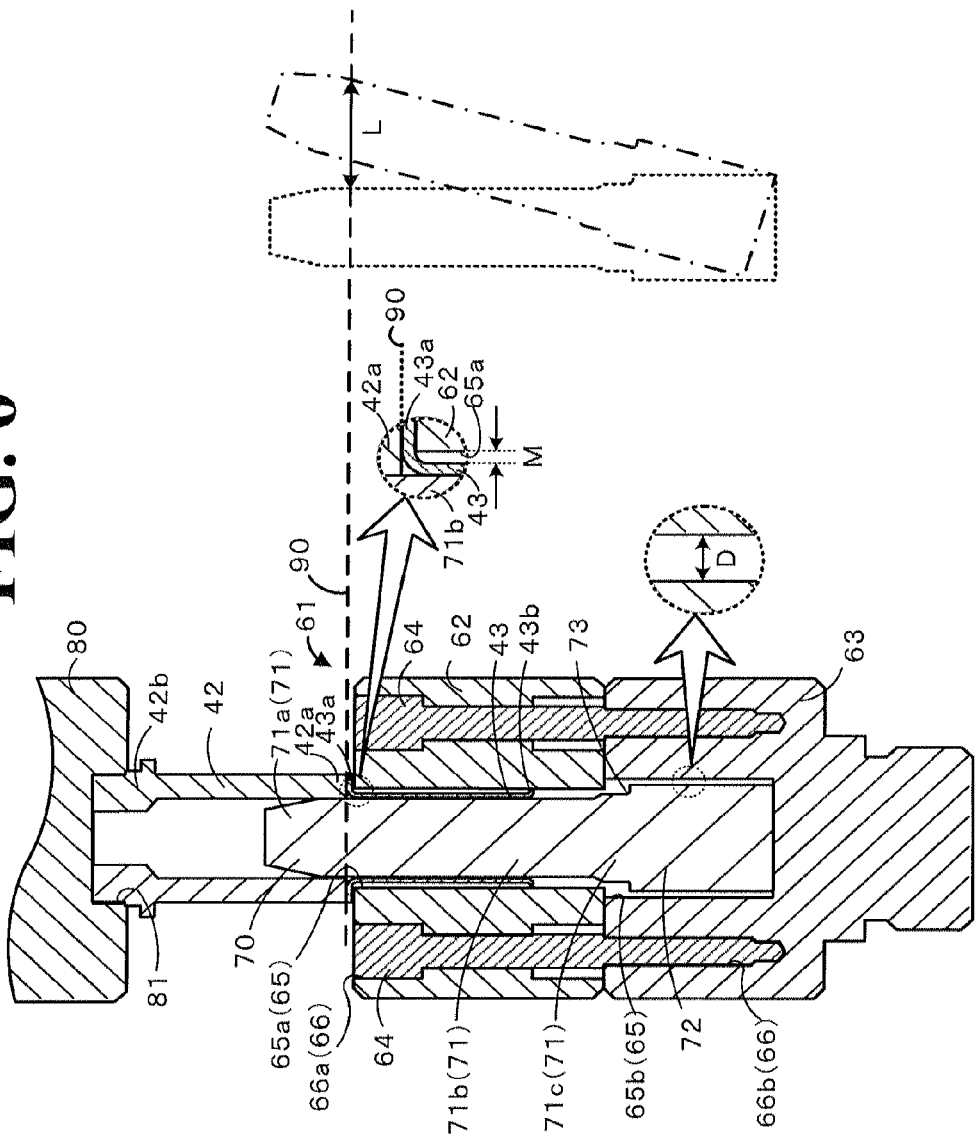

FIG. 9
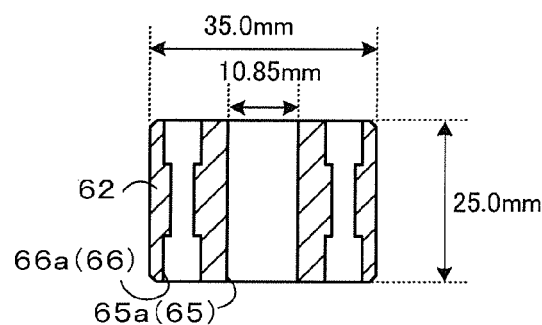
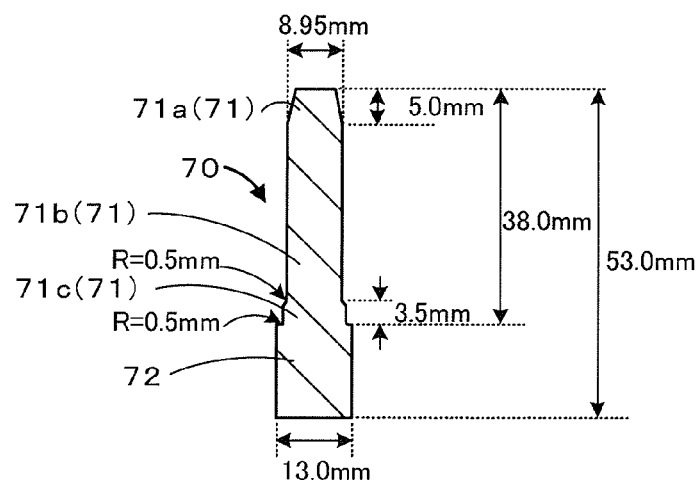
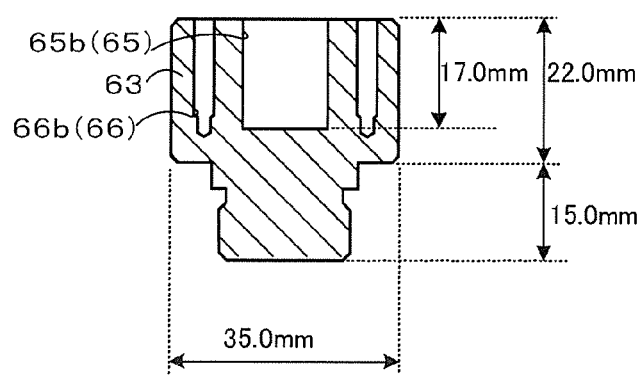

FIG. 10
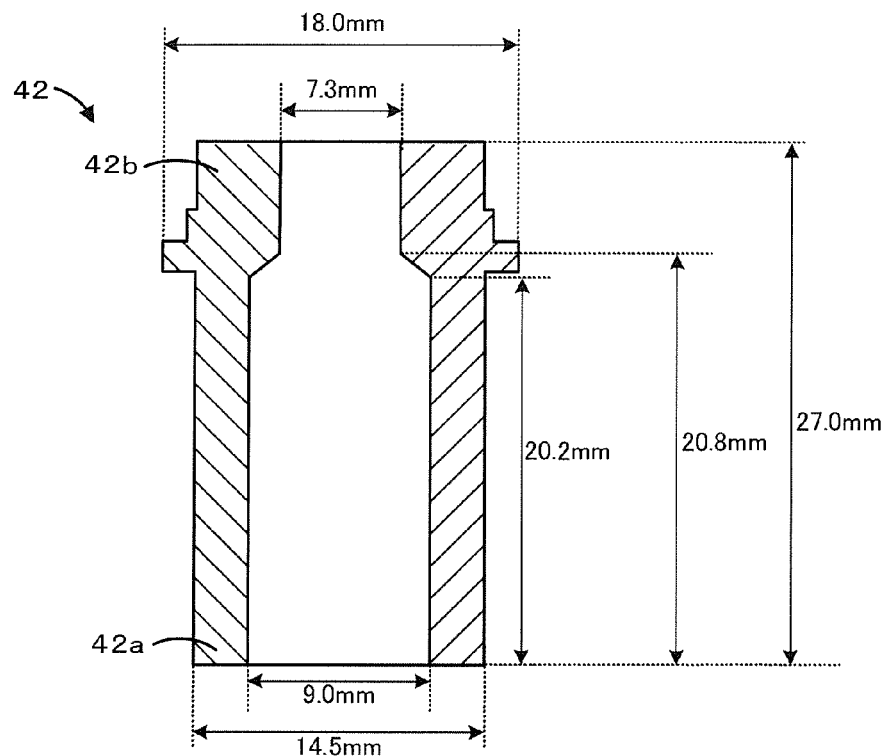
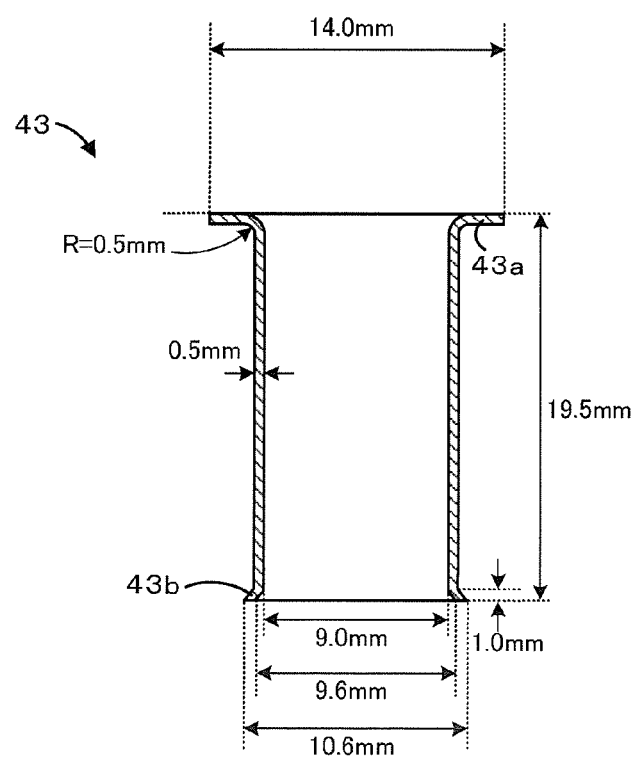

RESISTANCE WELDING METHOD AND RESISTANCE WELDING JIG

CROSS-REFERENCE TO RELATED APPLICATIONS

The present application claims the benefit of the priority from Japanese Patent Application No. 2011-076381 filed on Mar. 30, 2011, the entire contents of which are incorporated herein by reference.

BACKGROUND

1. Field of the Invention

The present invention relates to a resistance welding method and a resistance welding jig.

2. Background Information

Resistance welding is known as a method for welding two members together. In this method, the members are brought into contact with each other and clamped between two electrodes. In this state, pressure and current are applied to the members, so that the members are welded together owing to the current that flows through contact surfaces thereof. Japanese Unexamined Patent Application Publication No. 2000-337259, for example, describes a resistance welding method in which two members to be welded each include a step portion, and pressure is applied to the step portions of the members to weld the members together.

SUMMARY

The resistance welding may be performed to weld two cylindrical members together by bringing end portions of the members in contact with each other such that the members are coaxial with each other. In this case, there is a risk that the axes of the two members will be displaced from each other owing to a shearing stress applied to the contact surfaces of the two members when the pressure is applied in the current applying process. The displacement between the axes may be reduced by inserting a columnar guide pin into the two members to maintain the state in which the two members are coaxial with each other when the pressure and current are applied. However, in the case where the guide pin is formed of a material, such as a phenolic resin, that is softer than a ceramic, the guide pin becomes worn owing to the shearing stress and the diameter thereof decreases accordingly when the resistance welding is repeated. As a result, the state in which the two members are coaxial with each other cannot be maintained. If a guide pin formed of a relatively hard material, such as a ceramic, is used to prevent wear, there is a risk that the guide pin will break owing to the shearing stress when the resistance welding is repeated. Therefore, there has been a demand for a long-life guide pin that is resistant to wear and breakage for use in resistance welding.

The present invention has been made in view of the above-described problem, and a main object of the present invention is to provide a long-life guide pin for use in resistance welding.

To achieve the above-described object, the present invention provides the following means.

The present invention provides a resistance welding method for welding conductive cylindrical first and second members to each other in a coaxial manner by bringing end portions of the first and second members into contact with each other, the resistance welding method including the steps of:

(a) preparing a first electrode having an insertion hole and a columnar guide pin that is insertable into the insertion hole;

(b) positioning the guide pin and the first member by inserting the guide pin and the first member into the insertion hole such that the insertion hole, the first member, and the guide pin are coaxial with each other, that the first electrode contacts the first member, that the guide pin extends through the cylindrical first member, and that a portion of the first member to be welded and a portion of the guide pin project from the insertion hole;

(c) positioning the second member by inserting the guide pin into the cylindrical second member such that the end portions of the first and second members contact each other, that the first and second members are coaxial with each other, and that the second member does not contact the first electrode; and (d) welding the first and second members to each other at contact surfaces thereof by positioning a second electrode such that the second electrode contacts the second member but does not contact the first electrode and applying a voltage between the first and second electrodes to conduct a current through the contact surfaces of the first and second members while the first and second members are pressed in directions toward each other, wherein the guide pin is made of ceramic and a clearance is provided between the guide pin and an inner surface of the insertion hole in the state in which the guide pin is inserted in the insertion hole, the clearance allowing the guide pin to tilt in a radial direction of the guide pin while the state in which the first and second members contact each other is maintained when the current is conducted in (d).

According to this resistance welding method, the guide pin is made of ceramic. Therefore, when shearing stress due to the pressure applied to press the first and second members in directions toward each other is applied to the guide pin in the current applying process, the guide pin is more resistant to wear compared to a guide pin made of, for example, a phenolic resin. In addition, since the guide pin is capable of tilting in the radial direction, the guide pin can tilt so as to partially absorb the shearing stress. Therefore, the guide pin is more resistant to breakage compared to a guide pin made of ceramic that is not capable of tilting. Thus, the life of the guide pin used in resistance welding can be prolonged.

In the resistance welding method according to the present invention, on an imaginary plane that includes the contact surfaces of the end portions of the first and second members in step (d) and that is perpendicular to a central axis of the insertion hole, a tilting range in which the guide pin is capable of tilting owing to the clearance in the radial direction from the state in which an axis of the guide pin coincides with the central axis may be 0.1 mm or more. In this case, the shearing stress can be sufficiently absorbed, so that the effect of preventing the guide pin from breaking can be increased.

In the resistance welding method according to the present invention, the guide pin may include a columnar portion having a diameter such that the columnar portion is insertable into the first and second members and a large-diameter portion that coaxially continues from the columnar portion and has a diameter that is larger than the diameter of the columnar portion. In addition, the insertion hole in the first electrode may include a large-diameter hole into which the large-diameter portion is insertable and a small-diameter hole that coaxially continues from the large-diameter hole and has a diameter that is smaller than a diameter of the large-diameter hole and larger than the diameter of the columnar portion. In step (b), the guide pin may be positioned such that the insertion hole and the guide pin are coaxial with each other by inserting the large-diameter portion of the guide pin into the large-diameter hole and inserting the columnar portion of the guide pin through the small-diameter hole, and subsequently the first member may be positioned such that the first member is inserted in the small-diameter hole and the columnar portion extends through the cylindrical first member. In step (c), the columnar portion of the guide pin may be inserted into the cylindrical second member. The clearance may be a clearance between an inner surface of the large-diameter hole and the large-diameter portion in the state in which the guide pin is inserted in the insertion hole. In this case, when the first and second members are removed from the first electrode and the guide pin after the resistance welding process, the large-diameter portion of the guide pin becomes caught by the small-diameter hole, so that the first and second members can be easily removed after the welding process.

In the above-described resistance welding method in which the guide pin includes the columnar portion and the large-diameter portion, the guide pin may include a rising portion that rises from the outer peripheral surface of the columnar portion to the outer peripheral surface of the large-diameter portion and that is curved. In this case, since the rising portion at which the force tends to concentrate when the shearing stress is applied is curved, the guide pin does not easily break.

In the above-described resistance welding method in which the guide pin includes the columnar portion and the large-diameter portion, the first electrode may include a bottomed hole as the large-diameter hole, and, in step (b), when the guide pin is inserted into the insertion hole, an elastic member may be placed between a step surface of the large-diameter portion of the guide pin at an end adjacent to the columnar portion and a step surface of the small-diameter hole of the insertion hole at an end adjacent to the large-diameter hole, the elastic member generating an elastic force that presses the large-diameter portion of the guide pin toward the bottom of the large-diameter hole. In addition, in above-described resistance welding method in which the guide pin includes the columnar portion and the large-diameter portion, the first electrode may include a bottomed hole as the large-diameter hole, and, in step (b), when the guide pin is inserted into the insertion hole, an elastic member may be placed between a bottom surface of the large-diameter portion of the guide pin at an end opposite to the columnar portion and a bottom surface of the large-diameter hole, the elastic member generating an elastic force that presses the large-diameter portion of the guide pin toward a step surface of the small-diameter hole of the insertion hole at an end adjacent to the large-diameter hole. In such a case, the guide pin is pushed by the elastic member, so that the central axis of the guide pin is not easily displaced from that of the insertion hole after the guide pin is positioned. Therefore, subsequently, the first member can be easily inserted into the small-diameter hole.

The present invention provides a resistance welding jig, including:
 a first electrode having an insertion hole;
 a second electrode; and
 a columnar guide pin that is insertable into the insertion hole,
 wherein the guide pin is made of ceramic and a clearance is provided between the guide pin and an inner surface of the insertion hole in the state in which the guide pin is inserted in the insertion hole, the clearance allowing the guide pin to tilt in a radial direction of the guide pin.

In the resistance welding jig according to the present invention, the guide pin is made of ceramic, and is capable of tilting in the radial direction. Therefore, the life of the guide pin can be prolonged when the guide pin is used in, for example, the above-described resistance welding method. The various embodiments of the guide pin and the first electrode in the above-described resistance welding method may also be applied to the resistance welding jig according to the present invention. In addition, the resistance welding jig according to the present invention may further include the elastic member used in the above-described resistance welding method.

BRIEF DESCRIPTION OF DRAWINGS

Referring now to the attached drawings which form a part of this original disclosure:

FIG. 2 shows schematic sectional views illustrating a manufacturing process of a primary assembly 141;

FIG. 5 illustrates the manner in which the main metal piece 42 and the inner casing 43 are welded together by resistance welding;

FIG. 6 illustrates shearing stress and tilting of a guide pin 70;

FIG. 9 illustrates dimensions of resistance welding jigs according to Examples 1 to 5 and Comparative Example 1;

FIG. 10 illustrates dimensions of the main metal piece 42 and the inner casing 43.

DESCRIPTION OF PREFERRED EMBODIMENTS

An embodiment of the present invention will be described with reference to the drawings. First, the structure and manufacturing method of a gas sensor 10, which is an example of an object manufactured by a resistance welding method of the present invention, will be described. Then, the resistance welding method according to the present invention will be described.

Figure 1:
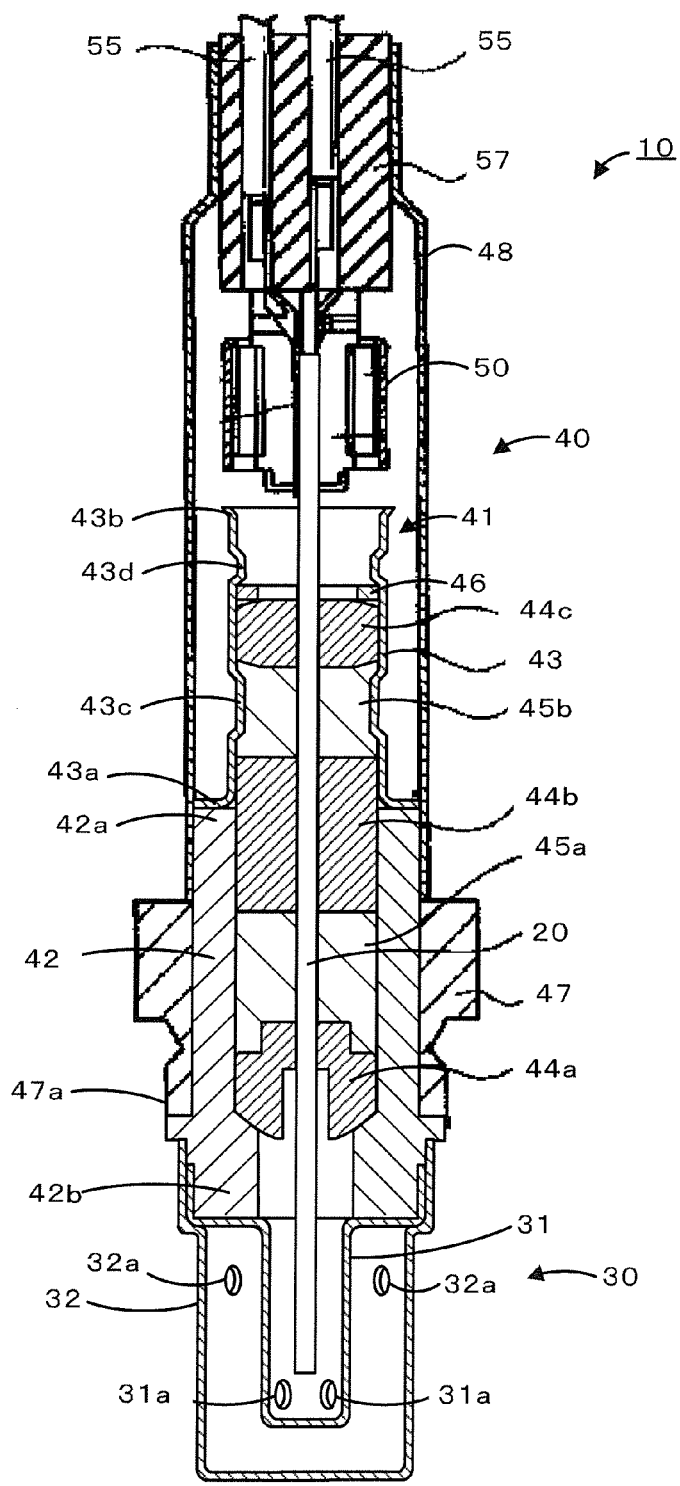
FIG. 1 is a longitudinal sectional view of a gas sensor 10.

FIG. 1 is a longitudinal sectional view of the gas sensor 10. Referring to FIG. 1, the gas sensor 10 includes a sensor element 20 that measures a certain gas component in gas to be measured; a protective cover 30 that protects an end portion of the sensor element 20; and a sensor assembly 40 including a connector 50 that is conductively connected to the sensor element 20. The gas sensor 10 is attached to, for example, an exhaust gas pipe of a vehicle to measure a gas component, such as $NO_x$ or $O_2$, in the exhaust gas, which is the gas to be measured. Such a gas sensor is described in, for example, Japanese Unexamined Patent Application Publication No. 10-318980.

The sensor element 20 is a long, thin plate-shaped element formed by stacking, for example, six ceramic substrates made of layers of oxygen-ion conductive solid electrolyte, such as zirconia ($ZrO_2$). The end portion of the sensor element 20 at the protective-cover-30 side is hereinafter referred to as a distal end, and the end portion of the sensor element 20 at the connector-50 side is hereinafter referred to as a proximal end. Electrodes (not shown) are provided on the front and back surfaces of the sensor element 20 at the proximal end thereof. The electrodes are used to apply a voltage to the sensor element 20 and output an electromotive force or a current generated in accordance with the concentration of the gas component detected by the sensor element 20. The electrodes are conductively connected to electrodes (not shown) provided on the sensor element 20 at the distal end thereof through an electrical circuit provided in the sensor element 20.

As illustrated in FIG. 1, the protective cover 30 is arranged to surround the distal end of the sensor element 20. The protective cover 30 includes an inner protective cover 31 that covers the distal end of the sensor element 20 and an outer protective cover 32 that covers the inner protective cover 31. The inner protective cover 31 is formed in a cylindrical shape and has inner protective cover holes 31a through which the gas to be measured is introduced to the distal end of the sensor element 20. The outer protective cover 32 is formed in a bottomed cylindrical shape and has outer protective cover holes 32a for introducing the gas to be measured in a side surface thereof. The inner protective cover 31 and the outer protective cover 32 are made of metal, such as stainless steel.

The sensor assembly 40 includes an element sealing member 41 with which the sensor element 20 is sealed and secured; a nut 47 and an outer casing 48 attached to the element sealing member 41; and the connector 50 connected to the proximal end of the sensor element 20. The element sealing member 41 secures the sensor element 20 and seals between the space in the protective cover 30 at the distal end of the sensor element and the space in the outer casing 48 at the proximal end of the sensor element. The element sealing member 41 includes a cylindrical main metal piece 42 and a cylindrical inner casing 43 that is welded to the main metal piece 42 at an end thereof such that the inner casing 43 is coaxial with the main metal piece 42. The element sealing member 41 further includes ceramic supports 44a to 44c, ceramic powder bodies 45a and 45b, and a metal ring 46 that are sealed in the main metal piece 42 and the inner casing 43. The main metal piece 42 includes an end portion 42a at the upper end in FIG. 1 and a thick portion 42b at the lower end in FIG. 1. The end portion 42a is welded to the inner casing 43. The thick portion 42b retains the ceramic support 44a so that the ceramic support 44a does not project downward therefrom in FIG. 1. The thickness of the inner casing 43 is smaller than that of the main metal piece 42. The inner casing 43 includes a flange portion 43a at an end at which the inner casing 43 is welded to the main metal piece 42 and an expanding portion 43b at the other end. The inner diameter of the expanding portion 43b increases toward the end. The inner casing 43 includes constricted portions 43c and 43d. The constricted portion 43c presses the ceramic powder body 45b toward the central axis of the inner casing 43. The constricted portion 43d presses the metal ring 46 so as to press the ceramic supports 44a to 44c and the ceramic powder bodies 45a and 45b downward in FIG. 1. The inner diameter of portions of the inner casing 43 other than the flange portion 43a, the expanding portion 43b, and the constricted portions 43c and 43d is substantially equal to the inner diameter of a portion of the main metal piece 42 other than the thick portion 42b. The ceramic powder body 45a fills the space between the ceramic supports 44a and 44b, and the ceramic powder body 45b fills the space between the ceramic supports 44b and 44c. The ceramic supports 44a to 44c and the ceramic powder bodies 45a and 45b are enclosed between the metal ring 46 and the thick portion 42b of the main metal piece 42. The sensor element 20 is disposed on the central axis of the main metal piece 42 and the inner casing 43. The sensor element 20 extends through and secured by the ceramic supports 44a to 44c and the ceramic powder bodies 45a and 45b. The nut 47 is coaxially fixed to the main metal piece 42, and includes an externally threaded portion 47a with which the nut 47 can be attached to, for example, an exhaust gas pipe of a vehicle. The outer casing 48 covers and surrounds the inner casing 43, the sensor element 20, and the connector 50, and lead wires 55 connected to the connector 50 extend to the outside of the outer casing 48. The lead wires 55 are conductively connected to the electrodes on the sensor element 20 through the connector 50. Gaps between the outer casing 48 and the lead wires 55 are sealed with a rubber stopper 57.

A method for manufacturing the gas sensor 10 will now be described. First, a primary assembly 141 including the element sealing member 41 and the sensor element 20 is manufactured. FIG. 2 shows schematic sectional views illustrating a manufacturing process of the primary assembly 141. First, the main metal piece 42 and the inner casing 43 are prepared (see FIG. 2A). At this time, the flange portion 43a and the expanding portion 43b of the inner casing 43 are already formed, but the constricted portions 43c and 43d are not formed yet. Then, the end portion 42a of the main metal piece 42 and the flange portion 43a of the inner casing 43 are brought into contact with each other and are welded to each other by resistance welding such that the main metal piece 42 and the inner casing 43 are coaxial with each other. As a result, a complex body 142 is formed (FIG. 2B). Thus, the main metal piece 42 and the inner casing 43 are welded together at the contact surfaces of the end portion 42a and the flange portion 43a. The resistance welding process will be described below. Then, the sensor element 20 is inserted through the metal ring 46, the ceramic support 44c, the ceramic powder body 45b, the ceramic support 44b, the ceramic powder body 45a, and the ceramic support 44a in that order. Then, these components are inserted into the complex body 142 from the side of the expanding portion 43b of the inner casing 43 (see FIG. 2C). The metal ring 46, the ceramic supports 44a to 44c, and the ceramic powder bodies 45a and 45b are formed to have holes that extend along the central axes thereof to allow the sensor element 20 to be inserted therethrough. Since the expanding portion 43b of the inner casing 43 is formed such that the diameter thereof increases toward the end, the above-mentioned components can be easily inserted into the complex body 142. The components are inserted into the complex body 142 by using a jig so that the central axis of the inner casing 43 coincides with the central axis of the sensor element 20 with the outer diameter of the inner casing 43 serving as a reference.

Next, the ceramic powder bodies 45a and 45b are compressed by pressing the metal ring 46 and the main metal piece 42 toward each other, so that the space inside the main metal piece 42 and the inner casing 43 is sealed. Then, the constricted portion 43d is formed by crimping the inner casing 43 at a position closer to the expanding portion 43b than the metal ring 46 (FIG. 2D). Accordingly, the pressing force applied between the metal ring 46 and the thick portion 42b of the main metal piece 42 is maintained. Next, the constricted portion 43c is formed by crimping the inner casing 43 at a position corresponding to the side surface of the ceramic powder body 45b (FIG. 2E). Thus, the space inside the main metal piece 42 and the inner casing 43 is reliably sealed and the sensor element 20 is reliably secured. Thus, the primary assembly 141 including the element sealing member 41 and the sensor element 20 is obtained.

After the primary assembly 141 is formed, the protective cover 30 is formed by welding the inner protective cover 31 and the outer protective cover 32 to the main metal piece 42, and the nut 47 is attached to the main metal piece 42 by inserting the primary assembly 141 into the nut 47. Then, the lead wires 55 that extend through the rubber stopper 57 and the connector 50 connected to the lead wires 55 are prepared, and the connector 50 is connected to the proximal end of the sensor element 20. Subsequently, the outer casing 48 is welded to the main metal piece 42. Thus, the gas sensor 10 illustrated in FIG. 1 is obtained.

Figure 3C:
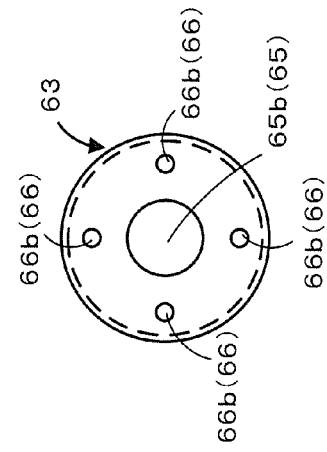
FIG. 3 illustrates the structure of a resistance welding jig 60.
Figure 3B:
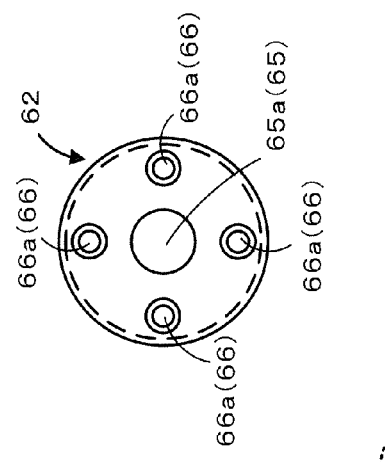
Figure 3A:
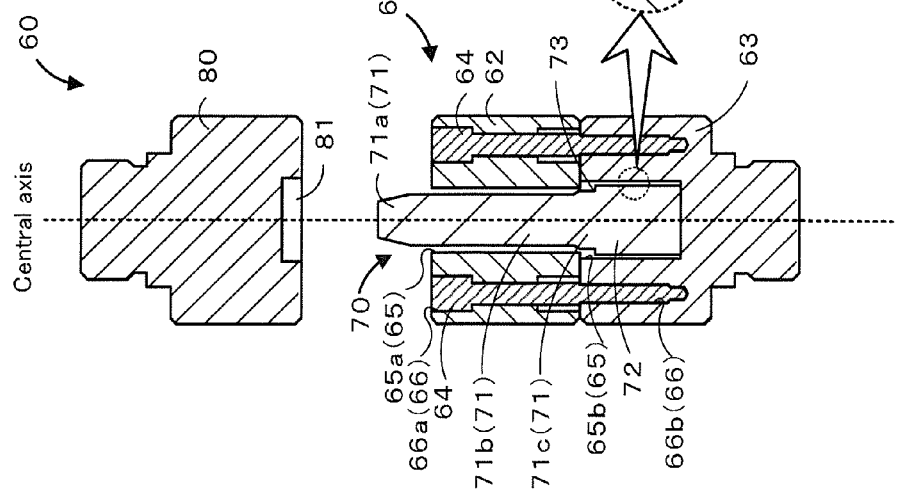

A method for welding the main metal piece 42 and the inner casing 43 to each other as described above with reference to FIG. 2B will now be explained as a resistance welding method according to an embodiment of the present invention. FIG. 3A is a longitudinal sectional view of a resistance welding jig 60 used in the welding process. FIG. 3B is a top surface of a conductive member 62, and FIG. 3C is top surface of a conductive member 63. As illustrated in FIG. 3A, the resistance welding jig 60 includes a first electrode 61, a guide pin 70, and a second electrode 80.

In the resistance welding process, the first electrode 61 positions the inner casing 43 and a voltage is applied between the first electrode 61 and the second electrode 80. The first electrode 61 includes the conductive members 62 and 63 and four securing pins 64 (only two securing pins 64 are illustrated). The conductive member 62 is cylindrical, and has a guide-pin insertion hole 65a through which the guide pin 70 is inserted and securing-pin insertion holes 66a through which the securing pins 64 are inserted. The conductive member 63 is also cylindrical, and has a guide-pin insertion hole 65b, which is a bottomed hole into which the guide pin 70 is inserted, and securing-pin insertion holes 66b, which are bottomed holes that receive the securing pins 64. The conductive members 62 and 63 have the same outer diameter. When the conductive members 62 and 63 are placed on top of each other such that the central axes of the outer peripheral circles thereof coincide with each other, the guide-pin insertion holes 65a and 65b communicate with each other to form a single hole (hereinafter referred to as a guide-pin insertion hole 65) and the securing-pin insertion holes 66a and 66b communicate with each other to form four holes (hereinafter referred to as securing-pin insertion holes 66). The securing pins 64 are inserted into the four securing-pin insertion holes 66, so that the conductive members 62 and 63 are secured coaxially with each other as illustrated in FIG. 3A. In the state illustrated in FIG. 3A, the bottom surface of the conductive member 62 is in contact with and conductively connected to the top surface of the conductive member 63. In addition, all of the central axes of the conductive members 62 and 63 and the central axes of the guide-pin insertion holes 65a and 65b coincide with one another. The diameter of the guide-pin insertion hole 65a is smaller than the diameter of the guide-pin insertion hole 65b.

The guide pin 70 is a columnar member made of ceramic, such as silicon nitride ($Si_3N_4$), zirconia ($ZrO_2$), or alumina ($Al_2O_3$), and is used to maintain the state in which the main metal piece 42 and the inner casing 43 are coaxial with each other. The guide pin 70 includes a columnar portion 71 and a large-diameter portion 72 that coaxially extends from the columnar portion 71 and that has a diameter larger than that of the columnar portion 71. The columnar portion 71 includes an end portion 71a, a small-diameter portion 71b, and an intermediate-diameter portion 71c. The diameter of the end portion 71a decreases toward the end face thereof (top face of the guide pin 70 in FIG. 3A). The diameters of the small-diameter portion 71b and the intermediate-diameter portion 71c are smaller than the diameter of the guide-pin insertion hole 65a and are smaller than or equal to the inner diameter of the inner casing 43 of the gas sensor 10. The diameter of the intermediate-diameter portion 71c is larger than that of the small-diameter portion 71b and smaller than that of the large-diameter portion 72. A rising portion 73 that rises from the outer peripheral surface of the intermediate-diameter portion 71c to the outer peripheral surface of the large-diameter portion 72 is curved so as to rise smoothly. The diameter of the large-diameter portion 72 is larger than that of the guide-pin insertion hole 65a and smaller than that of the guide-pin insertion hole 65b. The guide pin 70 is used in the resistance welding process while being inserted in the guide-pin insertion hole 65 and positioned such that the central axis thereof coincides with the central axis of the guide-pin insertion hole 65, as illustrated in FIG. 3A. In this state, the columnar portion 71 extends through the guide-pin insertion hole 65a and the large-diameter portion 72 is inserted in the guide-pin insertion hole 65b. Since the diameter of the large-diameter portion 72 is smaller than that of the guide-pin insertion hole 65b, a clearance D is provided between the large-diameter portion 72 and the inner surface of the guide-pin insertion hole 65b. The clearance D corresponds to the difference between the radii of the large-diameter portion 72 and the guide-pin insertion hole 65b. Owing to the clearance D, the guide pin 70 is not completely restrained even when the guide pin 70 is inserted in the guide-pin insertion hole 65, and is capable of tilting in the radial direction. The tilting of the guide pin 70 will be described below.

In the resistance welding process, the second electrode 80 positions the main metal piece 42 and a voltage is applied between the first electrode 61 and the second electrode 80. The second electrode 80 includes a recess 81 which receives the main metal piece 42 to position the main metal piece 42. The second electrode 80 is also used in the resistance welding process in a state such that the central axis thereof coincides with those of the first electrode 61 and the guide pin 70, as illustrated in FIG. 3A.

Figure 4B:
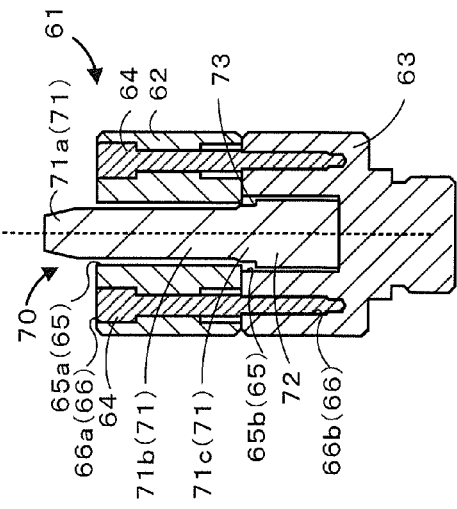
FIG. 4 illustrates the manner in which a main metal piece 42 and an inner casing 43 are welded together by resistance welding.
Figure 4A:
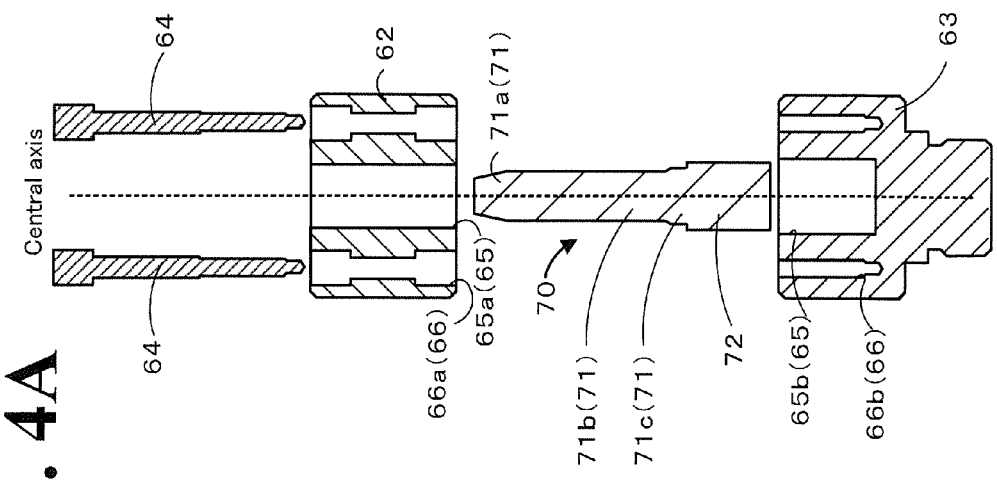

The manner in which the main metal piece 42 and the inner casing 43 are welded together by resistance welding by using the resistance welding jig 60 will now be described with reference to FIGS. 4 and 5. First, of the components of the resistance welding jig 60, the conductive members 62 and 63 and the securing pins 64, which form the first electrode 61, and the guide pin 70 are prepared (FIG. 4A) and are positioned by being assembled together (FIG. 4B). The assembly is performed as follows. That is, first, the large-diameter portion 72 of the guide pin 70 is inserted into the guide-pin insertion hole 65b of the conductive member 63. Then, the conductive members 62 and 63 are placed on top of each other in a manner such that the columnar portion 71 of the guide pin extends through the guide-pin insertion hole 65a in the conductive member 62. Thus, the conductive members 62 and 63 and the guide pin 70 are positioned coaxially with each other. Then, the securing pins 64 are inserted into the four securing-pin insertion holes 66, so that the conductive members 62 and 63 are coaxially secured to each other. The state of the first electrode 61 and the guide pin 70 after the assembly illustrated in FIG. 4B is the same as the state illustrated in FIG. 3A.

Next, the inner casing 43 is inserted into the guide-pin insertion hole 65a in a manner such that the flange portion 43a is at the top (FIG. 5A). Accordingly, the columnar portion 71 of the guide pin 70 extends through the inner casing 43 and the guide-pin insertion hole 65a, the guide pin 70, and the inner casing 43 are arranged coaxially with each other. The flange portion 43a, which is a member to be weld, of the inner casing 43 projects from the guide-pin insertion hole 65a since the outer diameter of the flange portion 43a is larger than the diameter of the guide-pin insertion hole 65a. Therefore, the bottom surface of the flange portion 43a and the top surface of the conductive member 62 come into contact with each other. In addition, the end portion 71a and a part of the small-diameter portion 71b of the columnar portion 71 of the guide pin 70 project upward from the flange portion 43a of the inner casing 43.

Next, the columnar portion 71 of the guide pin 70 is inserted into the main metal piece 42 in a manner such that the thick portion 42b is at the top (FIG. 5B). Accordingly, the end portion 42a of the main metal piece 42 and the flange portion 43a of the inner casing 43 come into contact with each other, and the main metal piece 42 and the inner casing 43 are positioned coaxially with each other by the guide pin 70. As illustrated in FIG. 5B, since the main metal piece 42 is in contact with the flange portion 43a that projects from the guide-pin insertion hole 65a, the main metal piece 42 does not come into contact with the first electrode 61.

Then, an end portion of the thick portion 42b of the main metal piece 42 is inserted into the recess 81 in the second electrode 80 (FIG. 5C). Thus, the second electrode 80 and the main metal piece 42 are coaxially positioned so as to be in contact with each other. As illustrated in FIG. 5C, the second electrode 80 is in contact with the thick portion 42b of the main metal piece 42, and is not in contact with the inner casing 43 or the first electrode 61. The first electrode 61 and the second electrode 80 are pressed along the central axis so that the main metal piece 42 and the inner casing 43 are pressed in directions toward each other, and a voltage is applied between the first electrode 61 and the second electrode 80 in the pressed state. Referring to FIG. 5C, an electrical circuit in which the first electrode 61, the inner casing 43, the main metal piece 42, and the second electrode 80 are arranged in that order is provided between the first electrode 61 and the second electrode 80. Therefore, a current flows through the contact surfaces of the flange portion 43a of the inner casing 43 and the end portion 42a of the main metal piece 42 in accordance with the voltage applied between the first electrode 61 and the second electrode 80. Owing to this current, the contact surfaces of the flange portion 43a and the end portion 42a of the main metal piece 42 are welded together. Thus, the main metal piece 42 and the inner casing 43 are welded together. As a result, the complex body 142 described above with reference to FIG. 2B is obtained. After the welding process, the application of pressure and current is stopped and the second electrode 80 is removed. Then, the complex body 142 is extracted upward. A process of welding another inner casing 43 and another main metal piece 42 together may be performed subsequently. In such a case, since the resistance welding jig 60 is already assembled as illustrated in FIG. 4B, the welding process may be started from the step of inserting the inner casing 43 as illustrated in FIG. 5A.

Shearing stress applied to the contact surfaces of the main metal piece 42 and the inner casing 43 and tilting of the guide pin 70 in the resistance welding process (when pressure and electricity are applied) will now be described with reference to FIG. 6. When the main metal piece 42 and the inner casing 43 are pressed in directions toward each other, shearing stress is applied to the contact surfaces of the main metal piece 42 and the inner casing 43 owing to the pressure applied thereto. In other words, when an imaginary plane 90 is a plane that includes the contact surfaces of the end portion 42a and the flange portion 43a and that is perpendicular to the central axis of the guide-pin insertion hole 65, the shearing stress is applied in a certain direction along the imaginary plane 90. Accordingly, the shearing stress is applied to the outer peripheral surface of the guide pin 70 at a position where the outer peripheral surface intersects the imaginary plane 90. As described above, since the clearance D is provided between the large-diameter portion 72 of the guide pin 70 and the inner surface of the guide-pin insertion hole 65b, the guide pin 70 tilts when the shearing stress is applied thereto. For example, when rightward shearing stress is generated along the imaginary plane 90 in FIG. 6, the state of the guide pin 70 changes from the state in which the axis of the guide pin 70 coincides with the central axis of the guide-pin insertion hole 65a (state shown by the dashed line in FIG. 6) to the state in which the guide pin 70 is tilted rightward (state shown by the one-dot chain line in FIG. 6). Accordingly, unlike the case in which the clearance D is not provided and the guide pin 70 is secured in the guide-pin insertion hole 65, the guide pin 70 can tilt so as to partially absorb the shearing stress. As a result, the guide pin 70 does not easily break. Even when the guide pin 70 is tilted, the guide pin 70 extends through the main metal piece 42 and the inner casing 43, and the main metal piece 42 and the inner casing 43 are pressed in directions toward each other. Accordingly, the state in which the main metal piece 42 and the inner casing 43 are in contact with each other is maintained.

Referring to FIG. 6, a movement distance L is defined as a distance by which the guide pin 70 is moved along the imaginary plane 90 by tilting from the state in which the axis of the guide pin 70 coincides with the central axis of the guide-pin insertion hole 65a. In this case, the tilting range in which the guide pin 70 can tilt is a maximum value Lmax of the movement distance L. The effect of partially absorbing the shearing stress can be obtained as long as the maximum value Lmax is greater than 0. The maximum value Lmax is preferably 0.1 mm or more. The maximum value Lmax is determined by the shapes of the guide pin 70, the guide-pin insertion hole 65, and the inner casing 43. Although the maximum value Lmax is increased as the value of the clearance D is increased, there is a limit to the amount by which the maximum value Lmax can be increased simply by increasing the clearance D since the tilting range of the guide pin 70 along the imaginary plane 90 is limited by the inner casing 43 and the inner surface of the guide-pin insertion hole 65a. In the present embodiment, the inner casing 43 includes the expanding portion 43b. Therefore, in the state in which the inner casing 43 is positioned to be coaxial with the guide-pin insertion hole 65a, as illustrated in FIG. 6, a side surface of the portion of the inner casing 43 other than the flange portion 43a and the expanding portion 43b are separated from the inner surface of the guide-pin insertion hole 65a by a distance M. When the inner casing 43 is pushed in a radial direction with respect to the central axis in response to the tilting of the guide pin 70, the inner casing 43 also becomes tilted in a manner similar to the guide pin 70. Accordingly, the central axis of the inner casing 43 becomes displaced from the central axis of the guide-pin insertion hole 65a, and the distance M decreases at an end in a direction in which the inner casing 43 is pressed (the distance M increases at the opposite end). Therefore, when the central axis of the inner casing 43 is displaced until the distance M is reduced to 0, the guide pin 70 cannot be moved further in the radial direction. Accordingly, when the clearance D is sufficiently large, the position of the guide pin 70 in this state defines the maximum value Lmax of the movement distance L. When the clearance D is small, the large-diameter portion 72 of the guide pin 70 comes into contact with the inner surface of the guide-pin insertion hole 65b before the distance M is reduced to 0, and the tilting range is limited accordingly. Even when the central axis of the inner casing 43 is displaced from the central axis of the guide-pin insertion hole 65a as described above, the state in which the inner casing 43 and the main metal piece 42 are coaxial with each other is maintained by the guide pin 70. The effect of maintaining the coaxial state provided by the guide pin 70 is increased as the diameter of the small-diameter portion 71b of the guide pin 70 becomes closer to the inner diameter of the inner casing 43 and the main metal piece 42.

As described in detail above, according to the resistance welding method of the present embodiment, the guide pin 70 is made of ceramic. Therefore, when the shearing stress due to the pressure applied to press the inner casing 43 and the main metal piece 42 in directions toward each other is applied to the guide pin 70 in the current applying process, the guide pin 70 is more resistant to wear compared to a guide pin made of, for example, a phenolic resin. In addition, since the guide pin 70 is capable of tilting in the radial direction, the guide pin 70 can tilt so as to partially absorb the shearing stress. Therefore, the guide pin 70 is more resistant to breakage compared to a guide pin made of ceramic that is not capable of tilting. Thus, the life of the guide pin 70 used in the resistance welding process can be prolonged.

The diameter of the large-diameter portion 72 of the guide pin 70 is larger than that of the guide-pin insertion hole 65a. Therefore, when the complex body 142 is removed from the first electrode 61 and the guide pin 70 after the resistance welding process, the large-diameter portion 72 is caught by the guide-pin insertion hole 65a, and the complex body 142 can be easily removed.

In the guide pin 70, the rising portion 73 that rises from the outer peripheral surface of the columnar portion 71 to the outer peripheral surface of the large-diameter portion 72 is curved. Since the rising portion 73 at which the force tends to concentrate when the shearing stress is applied to the guide pin 70 is curved, the guide pin 70 does not easily break.

It is to be understood that the present invention is not limited to the embodiments described above, and can be realized in various forms within the technical scope of the present invention.

Figure 7:
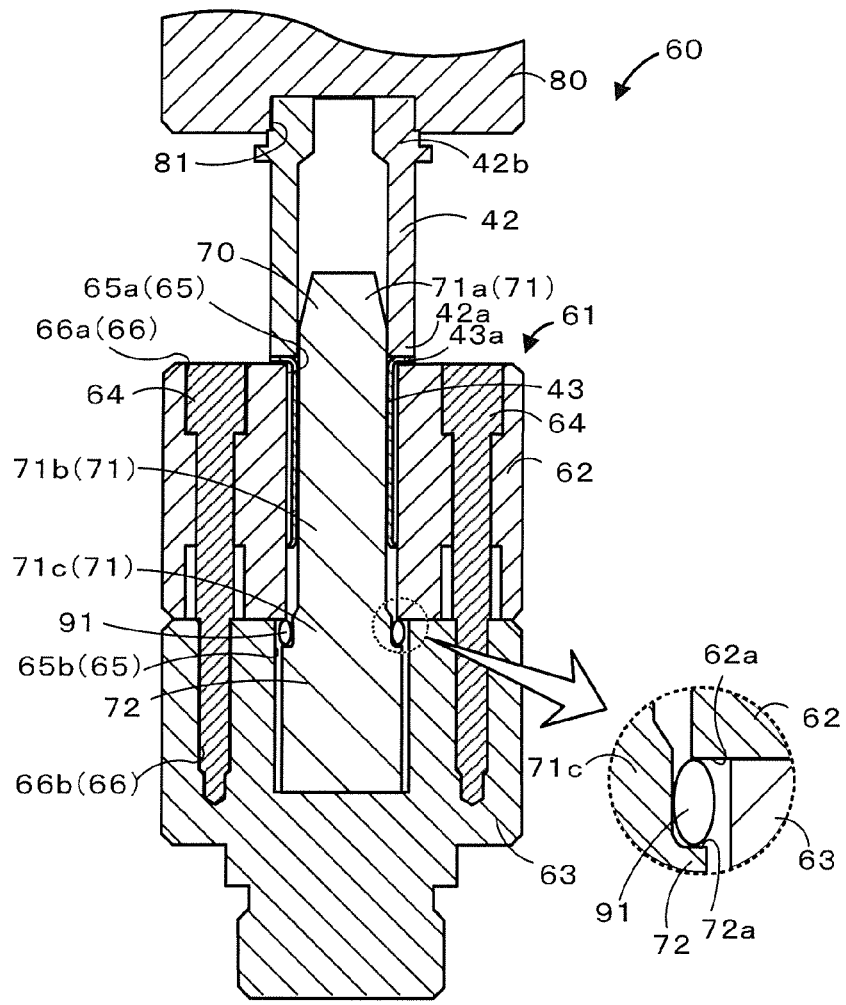
FIG. 7 illustrates a modification of the resistance welding jig 60.

For example, as illustrated in FIG. 7, the resistance welding jig 60 may further include an elastic member 91. The elastic member 91 is an O-ring made of resin, and is positioned such that the intermediate-diameter portion 71c extends through the elastic member 91 and the axis of the elastic member 91 coincided with the central axis of the guide pin 70. Thus, the elastic member 91 is disposed between a step surface 72a of the large-diameter portion 72 at the end adjacent to the intermediate-diameter portion 71c and a step surface 62a between the guide-pin insertion holes 65a and 65b. Accordingly, the large-diameter portion 72 is pressed toward the bottom of the guide-pin insertion hole 65b by the elastic force of the elastic member 91. Owing to the elastic member 91, the central axis of the guide pin 70 is not easily displaced after the guide pin 70 is positioned. Therefore, a situation can be prevented in which the inner casing 43 cannot be easily inserted into the guide-pin insertion hole 65a because of the displacement of the central axis of the guide pin 70. In other words, the inner casing 43 can be easily inserted. The elastic member 91 is not limited to an O-ring, and may instead have another shape or be a coil spring or a U-shaped spring made of metal instead of resin.

Figure 8:
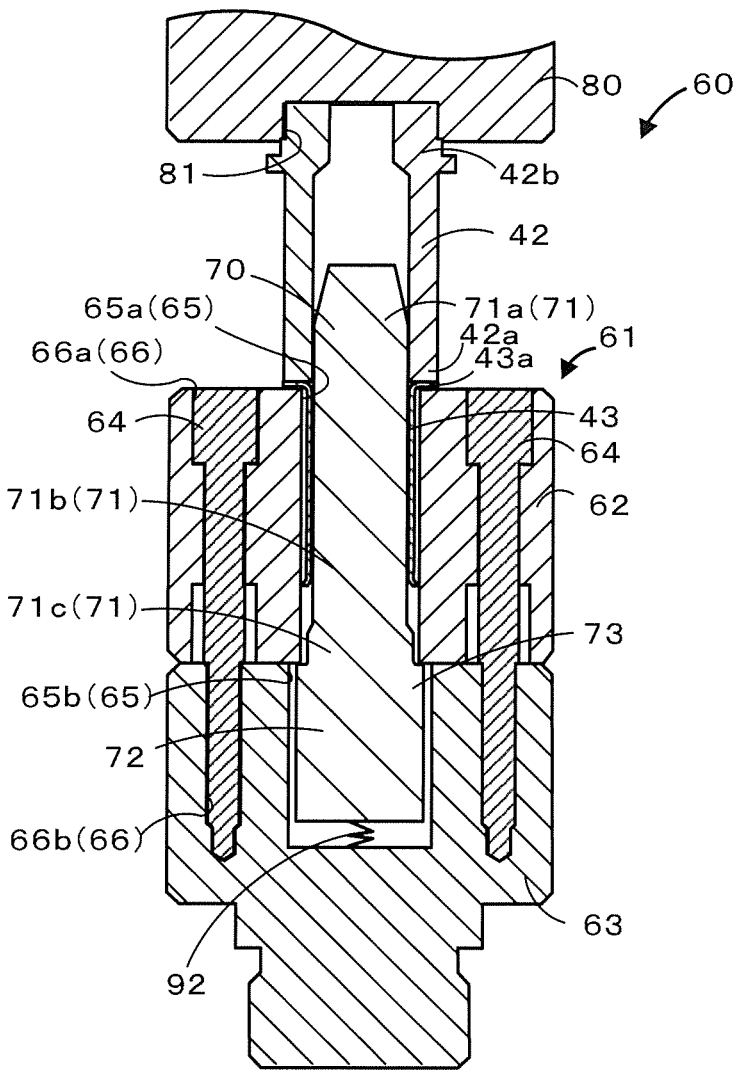
FIG. 8 illustrates a modification of the resistance welding jig 60.

Alternatively, as illustrated in FIG. 8, the resistance welding jig 60 may further include an elastic member 92. The elastic member 92 is a metal coil spring, and is disposed between the bottom surface of the large-diameter portion 72 and the bottom surface of the guide-pin insertion hole 65b. The guide pin 70 is pushed upward by the elastic force of the elastic member 92, and the top surface of the large-diameter portion 72 of the guide pin 70 is pressed against the bottom surface of the conductive member 62. Accordingly, similar to the case illustrated in FIG. 7, the central axis of the guide pin 70 is not easily displaced after the guide pin 70 is positioned and the inner casing 43 can be easily inserted. The elastic member 92 may be a member having another shape, such as a U-shaped spring, or be made of resin. The resistance welding jig 60 may include both the elastic member 91 illustrated in FIG. 7 and the elastic member 92 illustrated in FIG. 8.

In the above-described embodiment, the first electrode 61 and the guide pin 70 are shaped as illustrated in FIG. 3. However, the first electrode and the guide pin may have other shapes as long as a clearance that allows the guide pin to tilt in the radial direction is provided between the guide pin and the inner surface of the guide-pin insertion hole in the resistance welding process. For example, the guide-pin insertion holes 65a and 65b may have the same diameter. In addition, although the first electrode 61 includes the conductive members 62 and 63 and the securing pins 64, these components may be integrated with each other to form a first electrode having an integral structure. In this case, the guide-pin insertion hole 65 may be formed as a through hole without a bottom surface so that the guide pin 70 can be inserted from the guide-pin insertion hole 65b (from the bottom side in FIG. 3). In this case, a member that supports the first electrode and the bottom portion of the guide pin may be provided, and this member and the second electrode may be pressed toward each other in the resistance welding process. Alternatively, the guide-pin insertion hole 65 may be formed such that a bottom portion thereof can be opened and closed. In this case, the guide pin may be inserted into the guide-pin insertion hole 65 from the bottom, and then the bottom portion may be closed so as to support the guide pin. In addition, although the above-described guide pin 70 includes the columnar portion 71 including the end portion 71a, the small-diameter portion 71b, and the intermediate-diameter portion 71c and the large-diameter portion 72, the guide pin is not limited to this. For example, the intermediate-diameter portion 71c may be omitted, in which case the portion corresponding to the intermediate-diameter portion 71c has the same diameter as that of the small-diameter portion 71b. Alternatively, the large-diameter portion 72 may be omitted, in which case the portion corresponding to the large-diameter portion 72 has the same diameter as that of the small-diameter portion 71b or the intermediate-diameter portion 71c. In addition, the rising portion 73 may be shaped so as to rise perpendicularly instead of being curved.

According to the above-described embodiment, the inner casing 43 is shaped as illustrated in FIG. 2 in the resistance welding process. However, the shape of the inner casing 43 is not limited to this. For example, the inner casing 43 may be shaped such that the expanding portion 43b is not provided and an end portion and a body portion of the inner casing 43 (portions other than the flange portion 43a) have the same inner diameter. In this case, the outer diameter of the body portion of the inner casing 43 is set to be less than or equal to the diameter of the guide-pin insertion hole 65a. For example, the outer diameter of the body portion of the inner casing 43 may be equal to the diameter of the guide-pin insertion hole 65a. In this case, the distance M illustrated in FIG. 6 is constantly 0.

In the above-described embodiment, the conductive members 62 and 63 are coaxially secured to each other by inserting the securing pins 64 into the securing-pin insertion holes 66. However, the conductive members 62 and 63 may instead be secured by other methods. For example, the securing-pin insertion holes 66b may be internally threaded and the securing pins 64 may be externally threaded. In this case, the conductive members 62 and 63 may be secured to each other by screwing the securing pins 64 into the securing-pin insertion holes 66b.

EXAMPLES

Examples 1 to 5 and Comparative Example 1

Resistance welding jigs 60 according to Examples 1 to 5 having different dimensions and a resistance welding jig according to Comparative Example 1 were prepared. FIG. 9 shows the common dimensions of the resistance welding jigs, and dimensions that differ between the resistance welding jigs are shown in Table 1. The dimensions of the resistance welding jig according to Comparative Example 1 are the same as those of Example 1 except the large-diameter portion 72 and the guide-pin insertion hole 65b have the same diameter. Guide pins of Examples 1 to 5 and Comparative Example 1 were all made of ceramic, specifically, silicon nitride ($Si_3N_4$).

TABLE 1

|  | Example 1 | Example 2 | Example 3 | Example 4 | Example 5 | Comparative Example 1 |
| --- | --- | --- | --- | --- | --- | --- |
| Diameter of large-diameter portion 72 (mm) | 13.00 | 13.00 | 12.973 | 13.00 | 12.974 | 13.00 |
| Diameter of guide-pin insertion hole 65b (mm) | 13.021 | 13.05 | 13.09 | 13.07 | 13.06 | 13.00 |
| Tilting range (mm) | 0.05 | 0.120 | 0.280 | 0.168 | 0.205 | 0 |

[Evaluation Test 1]

The main metal piece 42 and the inner casing 43 illustrated in FIG. 2 were prepared, and were set to each of the resistance welding jigs according to Examples 1 to 5 and Comparative Example 1. Then, the tilting range (maximum value Lmax described above with reference to FIG. 6) of each resistance welding jig was measured. The result of the measurement is shown in Table 1. In Comparative Example 1, the tilting range is 0 mm since the large-diameter portion 72 and the guide-pin insertion hole 65b have the same diameter, as described above. The dimensions of the main metal piece 42 and the inner casing 43 are shown in FIG. 10. Then, resistance welding of the main metal piece 42 and the inner casing 43 having the dimensions illustrated in FIG. 10 was repeatedly performed by using the resistance welding jigs according to Examples 1 to 5 and Comparative Example 1, and the number of times the resistance welding was repeated before the guide pin 70 broke was measured. The relationship between the tilting range and the number of repetitions of Examples 1 to 5 and Comparative Example 1 is shown in FIG. 11.

Figure 11:
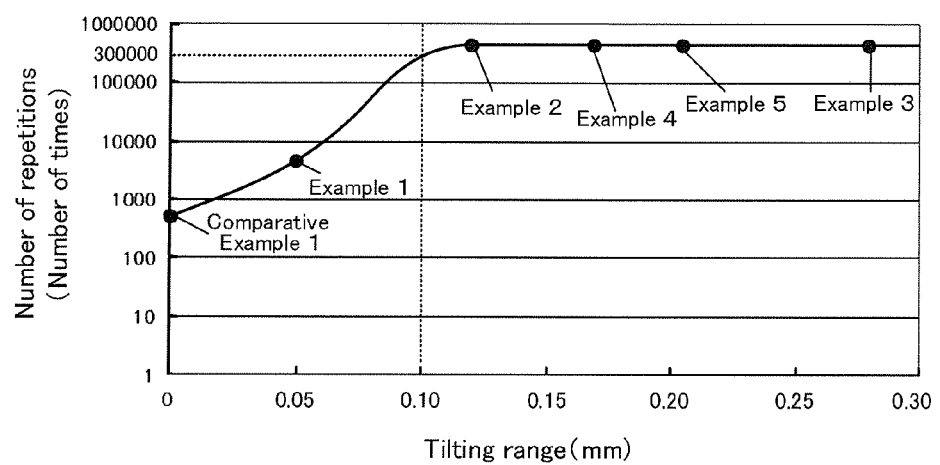
FIG. 11 is a graph illustrating the relationship between the tilting range and the number of repetitions.

As illustrated in FIG. 11, the number of times the resistance welding was repeated before the guide pin 70 broke according to Examples 1 to 5, in which the tilting range was greater than 0 mm, is greater than that according to Comparative Example 1, in which the tilting range was 0 mm. Thus, in Examples 1 to 5, the guide pin 70 does not easily break. When the tilting range was 0.1 mm or more, as in Examples 2 to 5, the number of repetitions was more than 300,000. Thus, a more preferable result was obtained.

Comparative Example 2

A resistance welding jig that was similar to the resistance welding jig of Example 2 except the guide pin was made of a phenolic resin was prepared as Comparative Example 2.

[Evaluation Test 2]

Resistance welding of the main metal piece 42 and the inner casing 43 having the dimensions illustrated in FIG. 10 was repeatedly performed by using the resistance welding jigs according to Example 2 and Comparative Example 2, and a change in diameter of the small-diameter portion 71b of the guide pin 70 due to wear was measured. As a result, according to Comparative Example 2, the diameter of the small-diameter portion 71b was reduced by 0.1 mm or more after the resistance welding was repeated 4,000 times. In contrast, according to Example 2, the small-diameter portion 71b did not wear even after the resistance welding was repeated 30,000 times. When the guide pin 70 wears, the axes of the main metal piece 42 and the inner casing 43 are easily displaced from each other in the welding process. As a result, yield of the process of manufacturing the complex body 142 is reduced. In addition, when the complex body 142 in which the axes are displaced from each other is used, there is a risk that the sensor element 20 will break when the sensor element 20, the metal ring 46, the ceramic supports 44a to 44c, and the ceramic powder bodies 45a and 45b are inserted into the complex body 142 as illustrated in FIG. 2C or in the crimping process illustrated in FIG. 2E.

What is claimed is:

1. A resistance welding method for welding conductive cylindrical first and second members to each other in a coaxial manner by bringing end portions of the cylindrical first and second members into contact with each other, the resistance welding method comprising:
providing a first electrode having an insertion hole and a columnar guide pin insertable into the insertion hole;
positioning the guide pin and the cylindrical first member by inserting the guide pin and the cylindrical first member into the insertion hole such that the insertion hole, the cylindrical first member, and the guide pin are coaxial with each other, such that the first electrode contacts the cylindrical first member, such that the guide pin extends through the cylindrical first member, and such that a portion of the cylindrical first member to be welded and a portion of the guide pin project from the insertion hole;
positioning the cylindrical second member by inserting the guide pin into the cylindrical second member such that the end portions of the cylindrical first and second members contact each other, such that the cylindrical first and second members are coaxial with each other, and such that the cylindrical second member does not contact the first electrode, the guide pin being made of ceramic and a clearance being disposed between the guide pin and an inner surface of the insertion hole while the guide pin is inserted in the insertion hole, the clearance enabling the guide pin to tilt in a radial direction of the insertion hole while contact is maintained between the cylindrical first and second members and a current is conducted during welding; and welding the cylindrical first and second members to each other at contact surfaces thereof by positioning a second electrode such that the second electrode contacts the cylindrical second member and does not directly contact the first electrode and applying a voltage between the first and second electrodes to conduct the current through the contact surfaces of the cylindrical first and second members while the cylindrical first and second members are pressed in directions toward each other.

2. The resistance welding method according to claim 1, wherein the guide pin includes a columnar portion having a diameter enabling the columnar portion to be insertable into the cylindrical first and second members and a large-diameter portion that coaxially continues from the columnar portion and has a diameter that is larger than the diameter of the columnar portion, the insertion hole in the first electrode includes a large-diameter hole into which the large-diameter portion is insertable and a small-diameter hole that coaxially continues from the large-diameter hole and has a diameter that is smaller than a diameter of the large-diameter hole and larger than the diameter of the columnar portion, the positioning the guide pin and the cylindrical first member includes positioning the guide pin such that the insertion hole and the guide pin are coaxial with each other by inserting the large-diameter portion of the guide pin into the large-diameter hole and inserting the columnar portion of the guide pin through the small-diameter hole, and subsequently positioning the cylindrical first member such that the cylindrical first member is inserted in the small-diameter hole and the columnar portion extends through the cylindrical first member, the positioning the cylindrical second member includes inserting the columnar portion of the guide pin into the cylindrical second member, and the clearance is between an inner surface of the large-diameter hole and the large-diameter portion when the guide pin is inserted in the insertion hole.

3. The resistance welding method according to claim 2, wherein the guide pin includes a rising portion that rises from the outer peripheral surface of the columnar portion to the outer peripheral surface of the large-diameter portion and that is curved.

4. The resistance welding method according to claim 2, wherein the first electrode includes a bottomed hole as the large-diameter hole, and the positioning the guide pin and the cylindrical first member includes, when the guide pin is inserted into the insertion hole, placing an elastic member between a step surface of the large-diameter portion of the guide pin at an end adjacent to the columnar portion and a step surface of the small-diameter hole of the insertion hole at an end adjacent to the large-diameter hole, the elastic member generating an elastic force that presses the large-diameter portion of the guide pin toward the bottom of the large-diameter hole.

5. The resistance welding method according to claim 2, wherein the first electrode includes a bottomed hole as the large-diameter hole, and the positioning the guide pin and the first member includes, when the guide pin is inserted into the insertion hole, placing an elastic member between a bottom surface of the large-diameter portion of the guide pin at an end opposite to the columnar portion and a bottom surface of the large-diameter hole, the elastic member generating an elastic force that presses the large-diameter portion of the guide pin toward a step surface of the small-diameter hole of the insertion hole at an end adjacent to the large-diameter hole.

6. The resistance welding method according to claim 1, wherein on an imaginary plane that passes through the contact surfaces of the end portions of the welded first and second members and that is perpendicular to a central axis of the insertion hole, a tilting range in which the guide pin is capable of tilting due to the clearance in the radial direction from the state in which an axis of the guide pin coincides with the central axis is 0.1 mm or more.

* * * * *